United States Patent
Ledenev

(10) Patent No.: US 9,098,704 B2
(45) Date of Patent: Aug. 4, 2015

(54) METHOD FOR FUNCTION CAPTURE AND MAINTAINING PARAMETER STACK

(71) Applicant: Kaspersky Lab, ZAO, Moscow (RU)

(72) Inventor: Alexander Ledenev, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 0 days.

(21) Appl. No.: 14/049,311

(22) Filed: Oct. 9, 2013

(65) Prior Publication Data

US 2015/0101052 A1 Apr. 9, 2015

(51) Int. Cl.
*G06F 21/54* (2013.01)
*G06F 21/56* (2013.01)

(52) U.S. Cl.
CPC ................... *G06F 21/566* (2013.01)

(58) Field of Classification Search
CPC ... G06F 21/561; G06F 21/566; G06F 21/567; G06F 8/67
USPC ....................... 726/23–25; 717/168
See application file for complete search history.

(56) References Cited

U.S. PATENT DOCUMENTS

| | | | | |
|---|---|---|---|---|
| 6,249,907 | B1 * | 6/2001 | Carter et al. | 717/129 |
| 7,823,201 | B1 | 10/2010 | Xu | |
| 7,870,541 | B1 * | 1/2011 | Deshpande | 717/131 |
| 7,886,287 | B1 * | 2/2011 | Davda | 717/168 |
| 8,499,354 | B1 * | 7/2013 | Satish et al. | 726/25 |
| 2008/0022378 | A1 | 1/2008 | Repasi et al. | |
| 2008/0141376 | A1 * | 6/2008 | Clausen et al. | 726/24 |
| 2009/0150999 | A1 * | 6/2009 | Dewey et al. | 726/24 |
| 2010/0031361 | A1 * | 2/2010 | Shukla | 726/24 |
| 2010/0095281 | A1 * | 4/2010 | Raber | 717/129 |
| 2012/0266243 | A1 * | 10/2012 | Turkulainen | 726/24 |
| 2013/0326627 | A1 * | 12/2013 | Zhao | 726/25 |
| 2014/0130161 | A1 * | 5/2014 | Golovanov | 726/23 |
| 2014/0173577 | A1 * | 6/2014 | Mitchell et al. | 717/168 |
| 2014/0282463 | A1 * | 9/2014 | Peckham | 717/168 |

FOREIGN PATENT DOCUMENTS

WO 2010123565 10/2010

OTHER PUBLICATIONS

Search Report in PCT/RU/2013/138673, dated Aug. 21, 2013.
Jurriaan Bremer, Security Lab, Interception of APIs, at http://www.securitylab.ru/analytics/428735.php, dated Aug. 23, 2012.
Zaitsev, O., Rootkits, Spyware/Adware, Keyloggers & Backdoors, available at http://books.google.ru/books?id=oCU4BAAAQBAJ&printsec=frontcover&hl=ru#v=onepage&q&f=false, pp. 36, 39, 59, 72, 107.

* cited by examiner

*Primary Examiner* — Izunna Okeke
*Assistant Examiner* — Hee Song
(74) *Attorney, Agent, or Firm* — Bardmesser Law Group

(57) ABSTRACT

A system and method for capturing and re-calling an application function. The method of function re-call during anti-virus check includes the following steps: function intercept (capture); anti-virus analysis of the parameters used to call the function; preparing of an application stack for function re-call (when the analysis did not detect any malicious functionality); and calling the function again. The exemplary method can be used with browsers and other applications.

13 Claims, 6 Drawing Sheets

METHOD FOR FUNCTION CAPTURE AND MAINTAINING PARAMETER STACK

BACKGROUND OF THE INVENTION

1. Field of the Invention

The present invention relates to anti-virus solutions and, in particular, to capturing (intercepting) a function called from a running application, while maintaining the function parameter stack for re-calling the function.

2. Description of the Related Art

Currently, malicious software (malware) has spread on a large scale. In the past, computer viruses were transferred on floppy disks, making it impossible to infect many computers simultaneously. However, with wide accessibility of the Internet, it has become easier to spread malware via malicious scripts on web pages, which often occurs invisibly to a user.

Modern browsers, unlike NCSA Mosaic (the first browser), are capable of displaying not only static pages, but also of providing a full-fledged interface between a user and a modern website. The modern browsers are compliant with various web-standards and technologies, such as CSS3, HTML5, Java, Javascript, RSS, etc. These technologies help browsers display and operate various interactive elements, thus facilitating the data input for the user. This interaction can cause serious flaws in information security.

The problem is that the newly developed standards do not sufficiently address security issues, such as vulnerability to XSS, CSRF and other attacks. One can see this just by typing a search query "html5 security issues." With web languages (such as, for example, Javascript), their creators put most efforts to make it easy to learn by users and to be efficiently interpreted by a browser, leaving the aspect of information security checks to programmers or to the browsers. This is a major reason why malicious scripts are so widespread in the Internet, and there is a need to detect the malware using existing anti-virus technologies.

Currently, the anti-virus (AV) technologies use the following conventional approach: when receiving a response from a web-server, the AV solution captures (intercepts) the web page and scans it for malicious URLs and scripts (e.g., written in Javascript) using the AV own script emulators. The main drawback of the conventional approach is that the anti-virus emulator (e.g., for Javascript) operates differently from the browser interpreters, which, on top of that, are constantly changed.

Another conventional approach is to intercept functions of the application in question (i.e., a browser), which are called when executing the web page scripts, thus capturing the threads of the browser Javascript interpreter. This approach requires application code analysis—in some cases, by disassembling the code when the application or library functions which are not documented, which is typical in proprietary software. After the unsecure functions are detected, the function capture utilities transfers the necessary parameters (i.e., the parameters used to call the initial function) to an anti-virus application for analysis. The conventional function capture utility can produce any of the following results:

- the function parameters have been recognized correctly, and the anti-virus software has not detected anything malicious, thus the initial function can be resumed with all recognized parameters;
- the function parameters have been recognized correctly, and the anti-virus software has detected malicious functions, thus the initial function needs to be interrupted;
- the function parameters have not been recognized correctly.

If the function parameters have not been recognized correctly, there is a need to re-call initial function with initial parameters. FIG. 1 illustrates a conventional function parameter stack for calling the functions of a running application. When a function is called, all necessary parameters (see stack frames $100a$, $100b$) and the return addresses A, B, etc. are stored in the stack. However, in order to determine the parameters used to call the initial function (whose number is unknown) by the function interceptor, the application must be debugged manually. Thus, the main drawback of the conventional approach is that it cannot be used for automated analysis.

A number of variables (of different types, such as strings, binary, integers or floating point variables) are written into the frame $100b$. The parameters can be recognized correctly only through manual analysis. Modern scripting languages, such as Javascript, do not have strict typing of parameter data. Thus, different functions (e.g., document.write or document.eval), when called, can transfer a different number of various parameters. Without a strict definition of the data types, 1 Kb of data can be received and not recognized as integers, floating point variables, strings, or any combination of the above. This fact makes analysis of the transferred function parameters even more difficult.

Another conventional approach is to implement a parameter analyzer for each specific function in the application. However, after an update it could still need manual analysis, which makes this approach very labor intensive. For example, U.S. Pat. No. 7,500,230 describes a method of statistical code analysis, which converts low-level stack operations into high-level ones by determining the number of transferred parameters and their types.

Thus, the system needs be able to re-call the initial application function with initial parameters, unless the anti-virus analysis has detected malicious activity and the initial function needs to be interrupted. Accordingly, the interceptor function has to call the initial function with an unknown number of parameters, while the interceptor function itself has the unknown number of parameters as well. The main drawback of this approach is that the captured parameters can be transferred correctly only if their data types are identified, which is not always possible. Therefore, the conventional approaches are ineffective and sometimes even unusable, because the re-calling of the captured function generates errors.

Accordingly, there is a need in the art for a method for re-calling the application captured function while maintaining the function parameter stack.

SUMMARY OF THE INVENTION

The present invention provides a method, system and computer program product for intercepting a function called from a running application while maintaining the function parameter stack for re-call of the function that substantially obviates one or several of the disadvantages of the related art.

In one aspect of the invention, a system and method for capturing and re-calling an application function are provided. According to an exemplary embodiment, the method of function re-call during anti-virus check comprises the following steps: function intercepting (capturing); anti-virus analysis of the parameters used to call the function; preparing of an application stack for function re-call (when the analysis did not detect any malicious functionality); and re-calling the function. The exemplary method can be used with browsers and other applications.

An interceptor executes some or all of the following operations: a direct modification of an executable code; disassembling of an import table to change the address of the called function in order to capture it; creation of hooks for particular events occurring during the execution of the application; and implementing the break points in the code at the function calls. The function interceptor prepares an application stack for a function re-call by storing the initial function return address before it was captured.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to an exemplary embodiment, a method, system and computer program product for capturing of the function called from a running application while maintaining the function parameter stack for re-call of the function are provided.

According to the exemplary embodiment, the method of function re-call during anti-virus check comprises the following steps: function intercepting (capturing); anti-virus analysis of the parameters used to call the function; preparing an application stack for function re-call (when the analysis did not detect any malicious functionality); and re-calling the function. The exemplary method can be used with browsers and other applications.

According to the exemplary embodiment, a function interceptor executes the following operations: direct modification of an executable code; disassembling of an import table to change the address of the called function in order to capture it; creation of hooks for particular events occurring during the execution of the application; implementing the break points in the code at the function calls. The function interceptor prepares an application stack for a function re-call by storing the initial function return address (from the ESP register) before it is captured.

Figure 1:
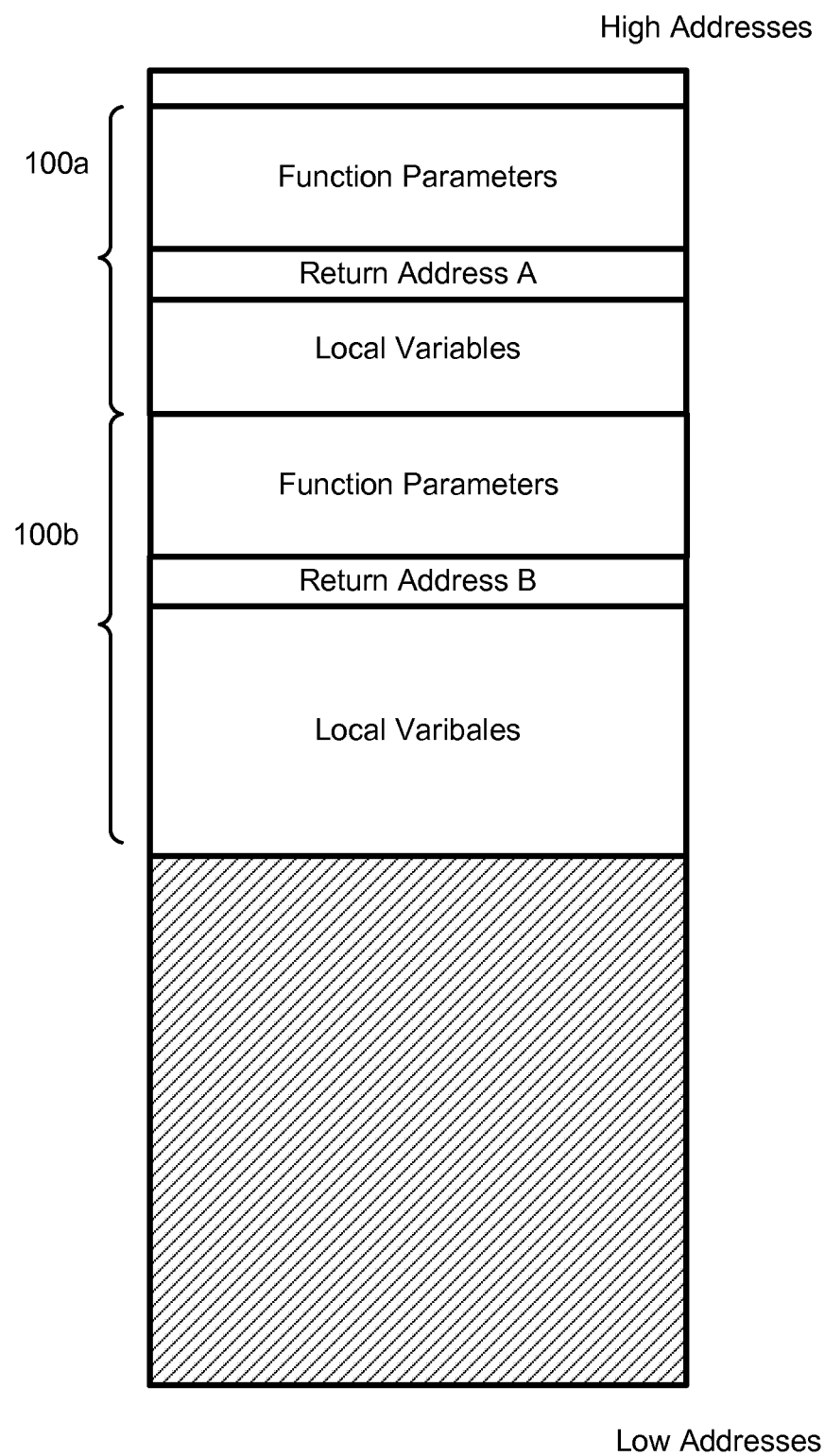
FIG. 1 illustrates a conventional stack, where parameters used to call the functions are stored.
Figure 2A:
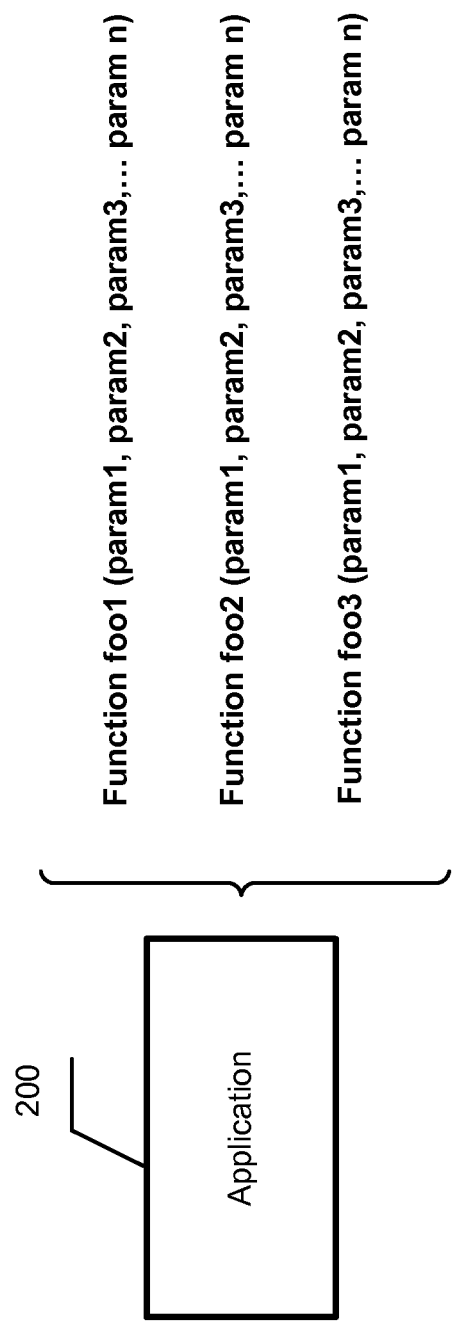
FIG. 2A illustrates an application (a browser), with a number of functions called during its execution.

FIG. 2A illustrates an application (in this case, a browser), with a number of functions called during its execution. In this example, the functions are called by the scripts, such as Javascript of VBScript, which parameters can contain malicious content. To check the scripts, the exemplary functions foo2 (param1, param2, param3, . . . paramn) and foo3 (param1, param2, param3, . . . paramn) need to be intercepted. Note that the number of function parameters can change due to the situation, when the function is called (i.e., the function foo2 can be called with one, two, three and even more parameters). The parameters are variables of any type (integer, floating point variable, string, Boolean variable, etc.). Note that unlike language with strictly defined parameter numbers and types, script languages often allow dynamic definition of parameter types and number of parameters, based on the context of the calling code. Thus, with script language, the same parameter can be an integer, a string, an array, and so on. Depending on the parameter types, the parsing process defines a corresponding model of script objects, which are then sent to the specific method of the script engine. This is why such script languages are so vulnerable to malicious code injection and other malware. Further, to increase throughput, custom functions using C/C++ are often used (rather than using public methods of the COM types)—which further increases the difficulty of malware analysis.

Figure 2B:
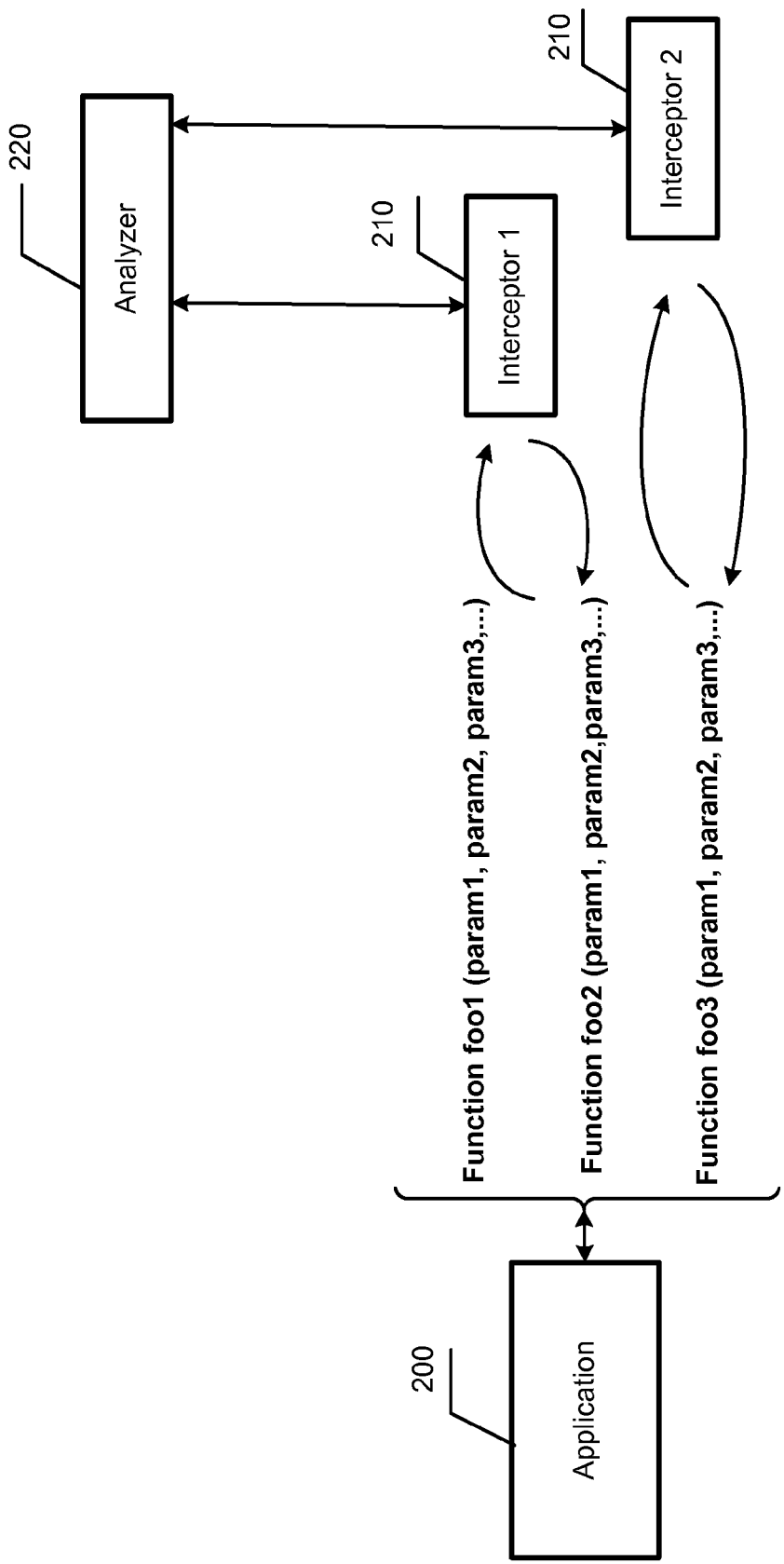
FIG. 2B illustrates an example of an application, where some functions have been captured, in accordance with the exemplary embodiment.

FIG. 2B illustrates an example of an application, where some functions have been intercepted (captured), in accordance with the exemplary embodiment. Interceptors 210 capture called functions foo2(param1, param2, param3, . . . ) and foo3(param1, param2, param3, . . . ). The capture process can be implemented by the following operations:

manually by direct modifications in the executable code of the function from the process memory, or automatically, by stopping the process, checking its memory using rules for detecting the instructions of interest, and changing the code in the memory, for example, through splicing;

by function hooking—i.e., disassembling the import table, finding the captured function's address and replacing it with that of the interceptor module, see generally http:**en.wikipedia.org/wiki/Portable_Executable#Import_Table;

by creating hooks for specific events taking place during the execution of the application (e.g., for calling a specific function when encountering call <functionname>); and by running the application 200 in a debug mode and placing the breakpoints at necessary function calls.

After the function call has been captured by the interceptor 210 (e.g., an anti-virus component), the function parameters are passed on to the analyzer 220 for the anti-virus (AV) scan, e.g., using signature and/or heuristic methods. The AV scan can use a number of conventional methods of analysis, such as signature matching, heuristic analysis, emulation, etc. In case the function is found to be malicious, it is interrupted, and the user is notified that some malicious code has been detected.

Figure 3:
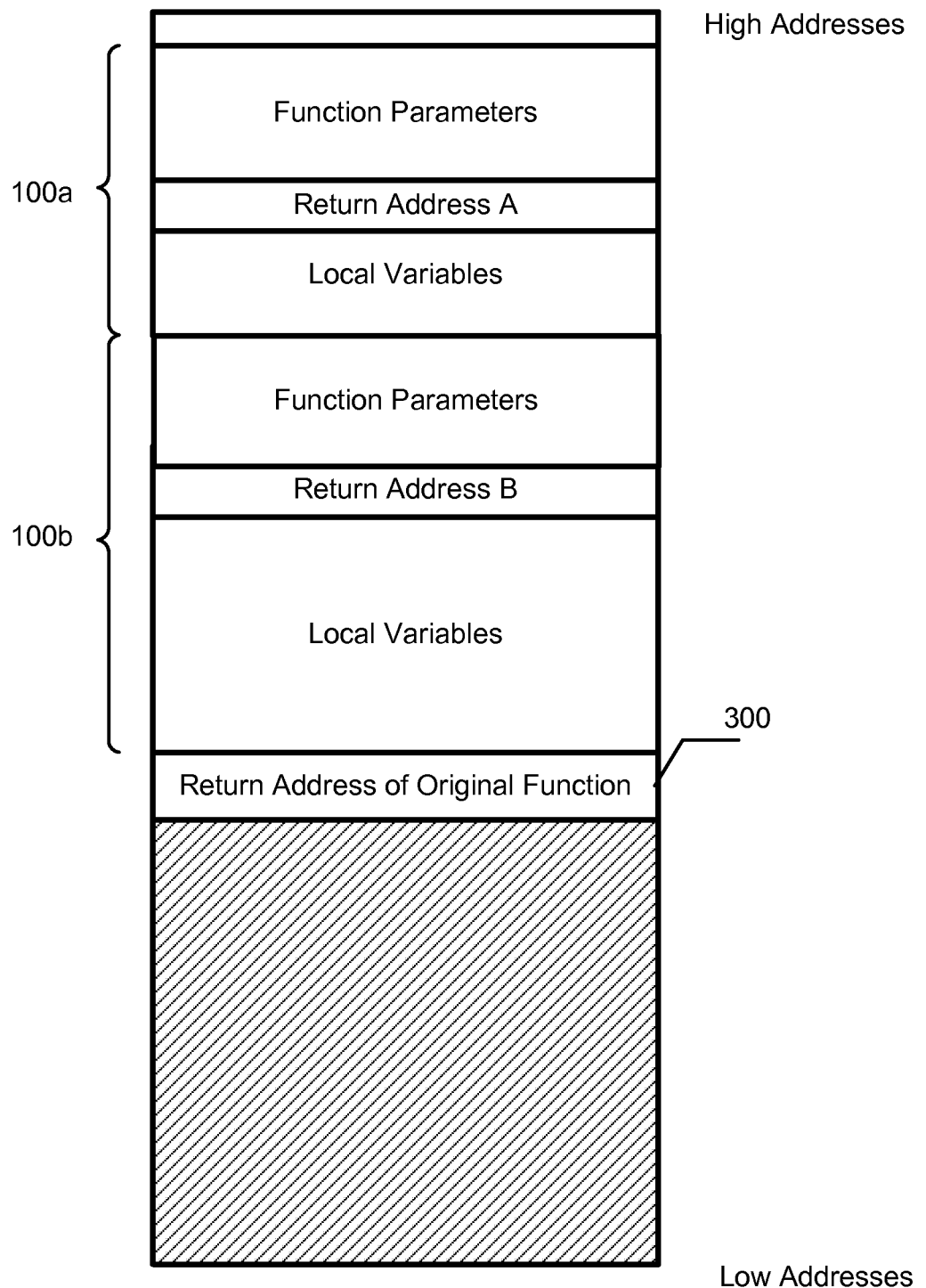
FIG. 3 illustrates the application stack return to its original state, when the captured function is called.

In cases, when the initial function needs to be resumed (either if the anti-virus software has not detected any malicious code or the function parameters have not been recognized correctly), the initial function is called again with its initial parameters stored in the stack. FIG. 3 illustrates the application stack return to its original state, when the captured function is called. In order for the function to resume correctly, the application stack needs to remain the same as it was when the function was initially called. In order to do that, the initial function return address before it was captured is stored in the stack at the address following the current stack pointer (SP/ESP register) 300. (Normally, only the last return address is of interest.) Different platforms can use the Assembler commands: x64-jmp, x86-ret. The exemplary embodiment uses a low-level language, since the function interceptor application does not depend on the language used to program the application in question.

Figure 4:
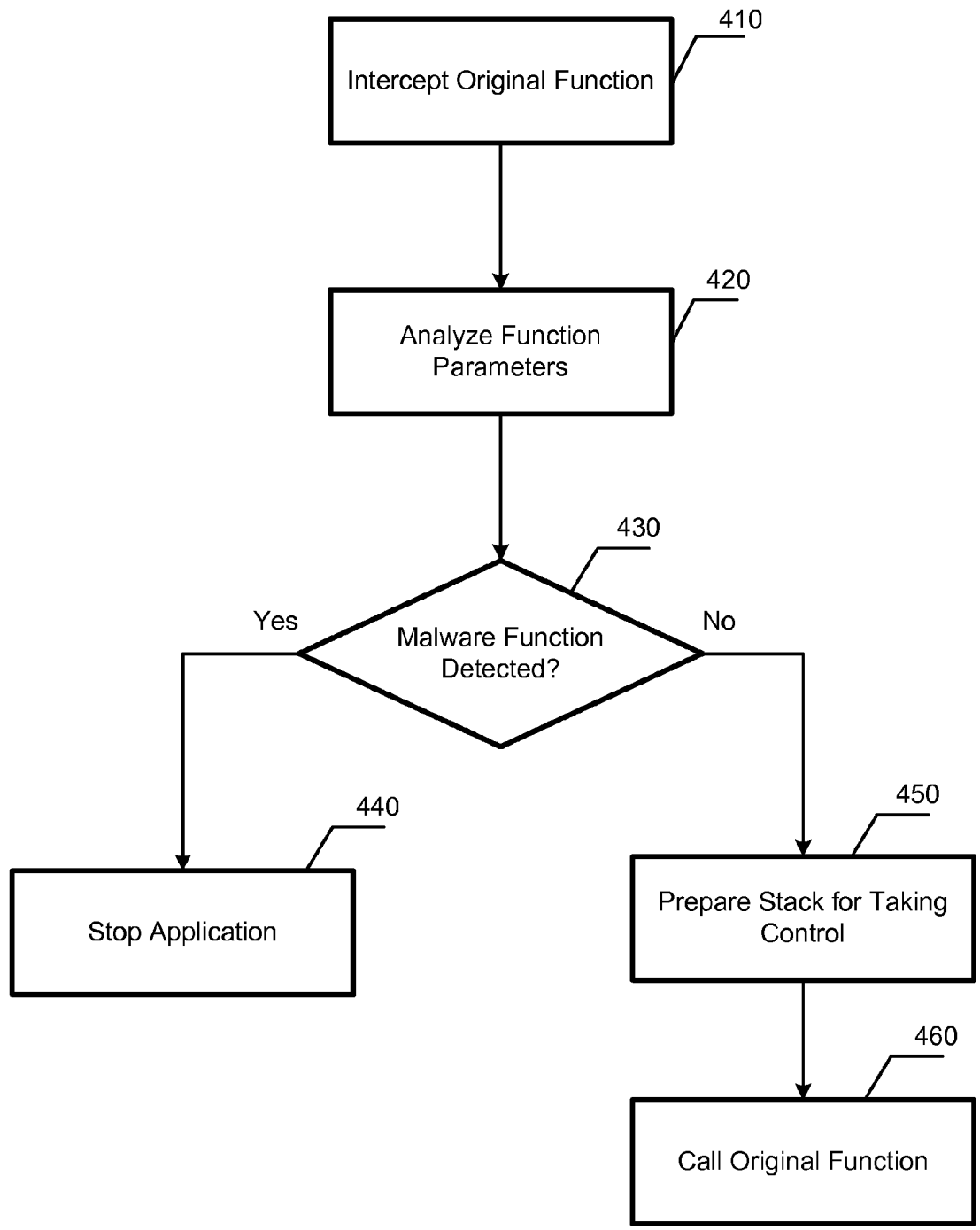
FIG. 4 illustrates a flow chart of the method, in accordance with the exemplary embodiment.

FIG. 4 illustrates a flow chart of the method, in accordance with the exemplary embodiment. In step 410, the initial function of the application 200 is captured by the capturer 210. In step 420, the parameters used to call the function are checked for malicious code by the analyzer 220. The malicious code can be spread within the parameters transferred by GET and POST requests. In step 430, if the malware function code is detected, the application is interrupted in step 440 before the initial function had been processed. Otherwise, the process moves to step 450 and prepares the initial stack for taking control. Subsequently, the initial function is re-called in step 460.

Figure 5:
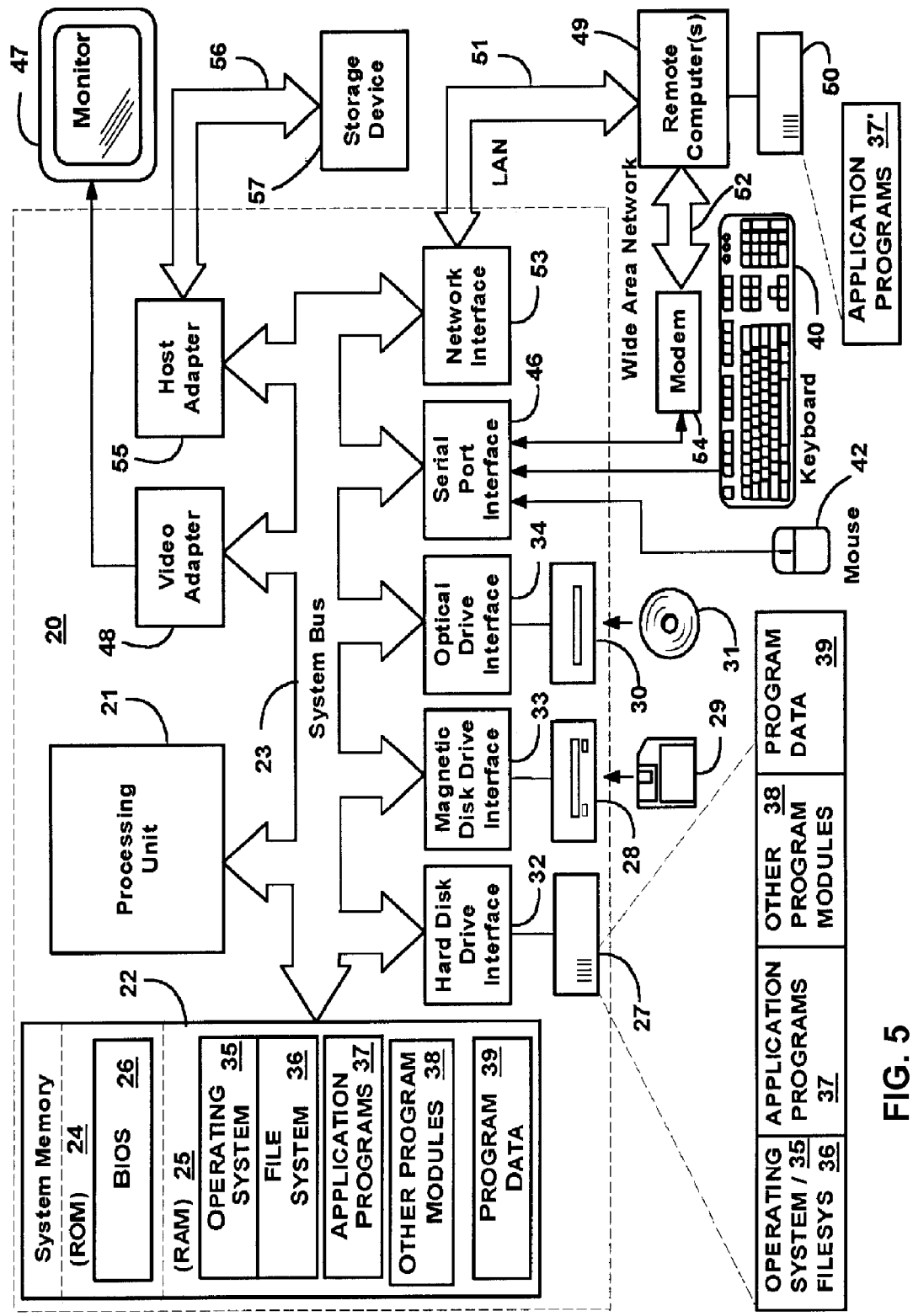
FIG. 5 illustrates a schematic of an exemplary computer system or a server that can be used for implementation of the invention.

With reference to FIG. 5, an exemplary system for implementing the invention includes a general purpose computing device in the form of a computer/server 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 20, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. In particular, those skilled in the art would appreciate that the proposed system and method provide for efficient re-call of the function interrupted by AV processing.

It should also be appreciated that various modifications, adaptations and alternative embodiments thereof may be made within the scope and spirit of the present invention. The invention is further defined by the following claims.

What is claimed is:

1. A computer-implemented method for intercepting and re-calling an application function, the method comprising:

launching an application executing at least one function having at least one parameter;

starting an interceptor module;

intercepting the function using the interceptor module, wherein the interceptor module performs direct modifications of an executable code of the function from a process memory through splicing and creates hooks for specific events taking place during execution of the application;

acquiring function parameters and storing the function parameters in a stack;

passing the function parameters to an analyzer;

analyzing the function parameters for malware;

terminating the application, when the malware is detected by the analyzer; and preparing a parameter stack and re-calling the function, when malware is not detected, and calling the function again with the parameters stored in the stack, where an initial function return address is stored in the stack at an address following a current stack pointer.

2. The method of claim 1, further comprising, notifying a user about detected malware.

3. The method of claim 1, further comprising, storing a function return address in the stack before the function is intercepted.

4. The method of claim 3, further comprising, calling the function again using the return address from the stack.

5. The method of claim 1, wherein the interceptor module also runs the application in a debug mode and places breakpoints at required function calls.

6. The method of claim 1, wherein the interceptor module performs function hooking that comprises: disassembling of an import table, finding the captured function's address and replacing the address with an address of the interceptor.

7. The method of claim 1, wherein the function parameters are any of:
   an integer;
   a floating point variable; and
   a Boolean variable.

8. The method of claim 1, wherein the analyzer performs any of:
   signature matching; and
   emulation.

9. The method of claim 1, wherein the interceptor module performs creation of hooks for specific events taking place during execution of the application.

10. The method of claim 1, wherein the interceptor module performs running the application in a debug mode and placing breakpoints at required function calls.

11. The method of claim 1, wherein the analyzer performs signature matching.

12. The method of claim 1, wherein the analyzer performs emulation.

13. A system for intercepting and re-calling an application function, the system comprising:
   a processor;
   a memory coupled to the processor;
   an interceptor module stored in the memory;
   a computer program logic stored in the memory and executed on the processor, the computer program logic is configured to implement the steps of:
   launching an application executing at least one function having at least one parameter;
   starting the interceptor module;
   intercepting the function using the interceptor module, wherein the interceptor module performs direct modifications of an executable code of the function from a process memory through splicing and creates hooks for specific events taking place during execution of the application;
   acquiring function parameters and storing the function parameters in a stack;
   passing the function parameters to an analyzer;
   analyzing the function parameters for malware;
   terminating the application, when the malware is detected by the analyzer; and
   preparing a parameter stack and re-calling the function, when malware is not detected, and calling the function again with the parameters stored in the stack, where an initial function return address is stored in the stack at an address following a current stack pointer.

\* \* \* \* \*